April 30, 1957 L. A. OHLINGER 2,790,761
NEUTRONIC REACTOR
Filed May 16, 1952 2 Sheets-Sheet 1

INVENTOR.
Leo A. Ohlinger
BY
Roland A. Anderson
Attorney.

April 30, 1957 L. A. OHLINGER 2,790,761
NEUTRONIC REACTOR
Filed May 16, 1952 2 Sheets-Sheet 2

INVENTOR.
Leo A. Ohlinger
BY
Roland A. Anderson
Attorney

United States Patent Office 2,790,761
Patented Apr. 30, 1957

2,790,761

NEUTRONIC REACTOR

Leo A. Ohlinger, Los Angeles, Calif., assignor to the United States of America as represented by the United States Atomic Energy Commission Application May 16, 1952, Serial No. 288,202

4 Claims. (Cl. 204—193)

The present invention relates to neutron chain reactors, and to apparatus for controlling reactors.

Neutron chain reactions are possible because a free neutron impinging upon atoms of fissionable material will, under certain circumstances, be absorbed by an atom of fissionable material ejecting a plurality of neutrons, this particular absorption being known as fission. Since the fission produced neutrons are free to produce fissions themselves, the process may be repeated to produce an ever increasing number of neutrons under favorable conditions. Such a process has been termed a divergent chain neutron reaction, and it may readily be seen that such a reaction may proceed without limits unless controlled. A neutronic chain reaction which is unable to produce enough neutrons to maintain its neutron density level is said to be a converging reaction.

Actually, there are certain physical constraints which must be placed upon the chain reacting system in order for the system to become divergent. The number of neutrons ejected by a single fission is not very great, and a portion of these neutrons will always be lost to the reaction, whether by leakage from the region of the reaction, non-fission absorption in fissionable materials, or by absorption in non-fissionable materials. It is thus possible to control a neutron chain reaction by controlling the physical constraints which permit the reaction to become divergent.

One of the methods which has been used in the art to control a neutronic reaction zone is to insert into the reaction quantities of material which readily absorb neutrons, thereby reducing the number of neutrons in the reaction zone available for fission. Usually rods or sheets of materials having high neutron capture cross sections are positioned partially within the neutron chain reaction zone to absorb neutrons. However, these sheets or rods must be replaced, since the neutron absorbing elements are converted to other elements with different physical and chemical properties by the absorption of neutrons, thereby losing their effectiveness to control the neutronic chain reaction.

Certain types of fissionable material will only produce a plurality of neutrons when bombarded by neutrons having thermal energy. Under these circumstances, it is necessary to reduce the energy of fission ejected neutrons to approximately thermal level before a large proportion of the fission ejected neutrons can produce fission, and thereby create a divergent neutronic chain reaction. Such reactions are often achieved by disposing fissionable material within a mass of neutron moderating material, the fissionable material generally being in the form of bodies and positioned in a geometric lattice. Neutron moderating material is any material which is effective for reducing the energies of neutrons, and in practice is limited to materials having "moderating ratios" at least as great as that of ordinary water, the "moderating ratio" of a material being defined by the expression $$\frac{\sigma_s \xi}{\sigma_c}$$

where $\sigma_s$ is the neutron scattering cross section of the material, $\sigma_c$ is the neutron capture cross section for the material, and $\xi$ is the mean logarithmic energy loss per neutron collision with an atom of the material. Moderated neutronic reactors of the type described above can be controlled by changing the amount of moderator material disposed between the bodies of fissionable material, or by varying the distance between bodies of the fissionable material.

There is also a minimum or "critical" size for the physical embodiment which is to produce the neutronic chain reaction. For all physical embodiments smaller than the critical size, the number of neutrons escaping from the peripheral portions of the embodiment will exceed the permissible number of neutrons which may be lost to the reaction without making the reaction converging. Hence, varying the physical size of the embodiment may also be used to control the neutronic chain reaction.

The physical size of the embodiment may be materially reduced and still remain greater than critical size by providing the embodiment with a reflector around the periphery thereof. The most important consideration in chosing a material for a reflector is that the material must have a small neutron capture cross section, at least as small as that of potassium, but a high neutron scattering cross section is also desirable if the reflector is to be efficient. Hence, moderator materials are also good reflectors. The reflector will be effective to turn back neutrons directed from the embodiment and make them available to the reaction. It is an object of the present invention to provide a method of controlling neutronic reactions which varies the reflection properties of a reflector disposed about the periphery of the reaction, and to provide a neutronic reactor controlled by such methods.

It is also an object of the present invention to provide means for carrying out the control methods above which are reliable, durable and shut down the reactor in the event of failures.

Other objects and advantages of the present invention will become apparent to the man skilled in the art from a further reading of the present disclosure, particularly when viewed in the light of the drawings, in which.

Figure 1:
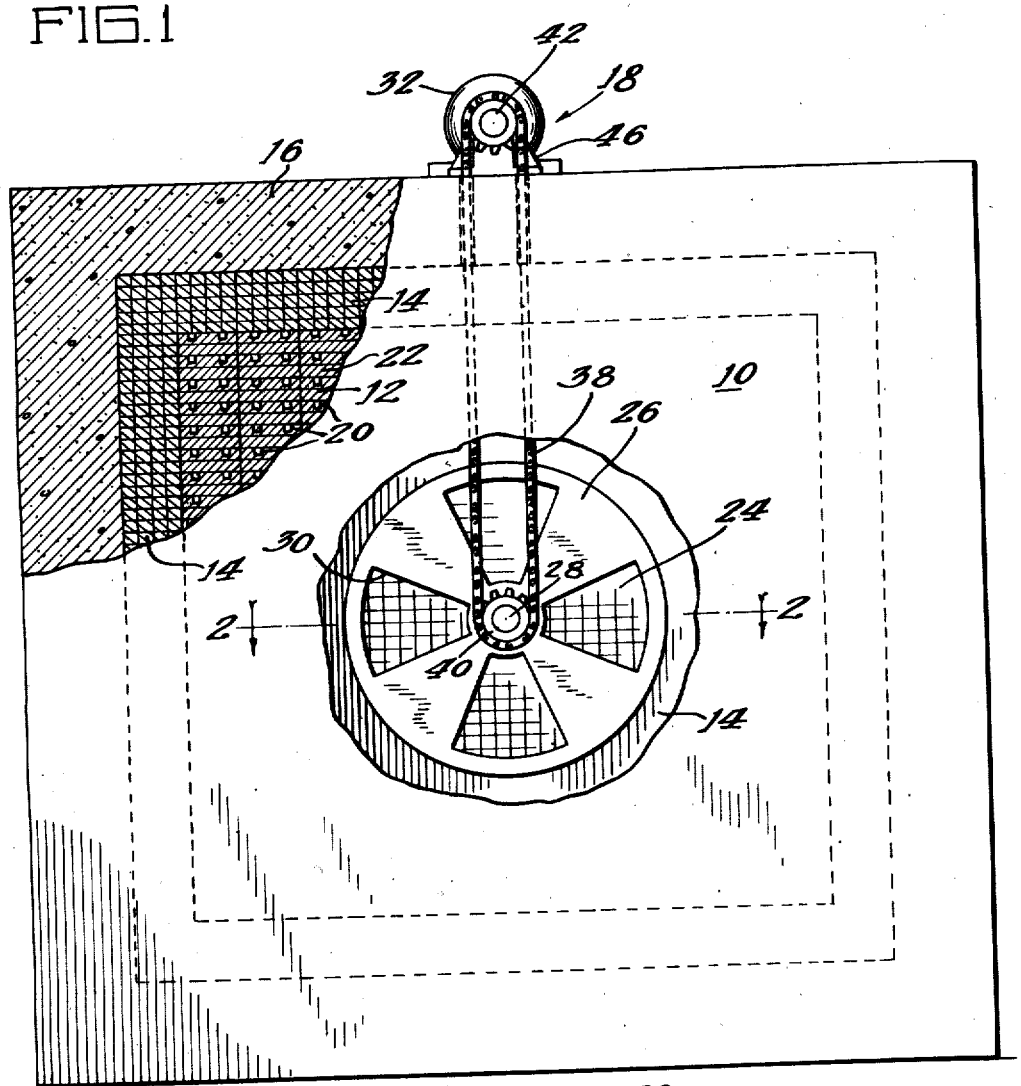
Figure 1 is an elevational view, partly cut away and in section, of a neutronic reactor illustrating the present invention.
Figure 2:
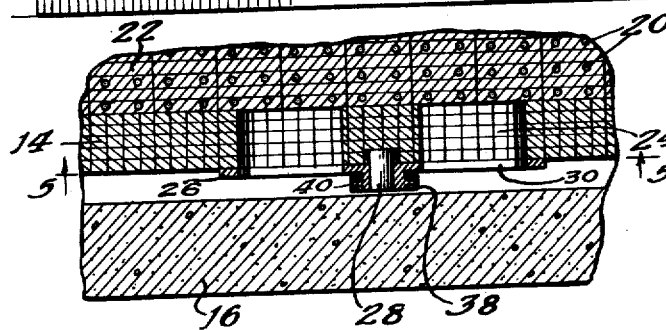
Figure 2 is a sectional view of a portion of the neutronic reactor shown in Figure 1, the view being taken along line 2—2 of Figure 1, the control means being in position of minimum neutron reproduction.

A neutronic reactor 10 consists generally of an active portion 12, a reflector 14, a shield 16, and means for controlling the neutron chain reaction 18. The active portion 12 of the reactor 10 is the region in which the neutronic chain reaction occurs, is in the form of a cube, and contains bodies of material 20 fissionable with neutrons of thermal energy disposed within rectangular bodies of moderator material 22. The thermal neutron fissionable material may be natural uranium, $U^{235}$, plutonium, or any of the other well known fissionable materials. The moderator material 22 may be graphite. The materials chosen for the active portion 12 of the reactor 10 determine the lattice and spacings used in the active portion 12. The reflector 14 entirely surrounds the cube forming the active portion 12 of the reactor 10, and may be constructed of any of the reflector materials. The shield 16 is illustrated as constructed of concrete, but other materials having high neutron capture cross sections may also be used. A more complete description of the active portion 12, reflector 14 and shield 16 of a similar reactor appears in the patent application of Enrico Fermi and Leo Szilard, Serial No. 568,904, filed December 19, 1944, now Patent No. 2,708,656, dated May 17, 1955, particularly Figures 7 through 15 and the descriptive matter relating thereto.

Figure 3:
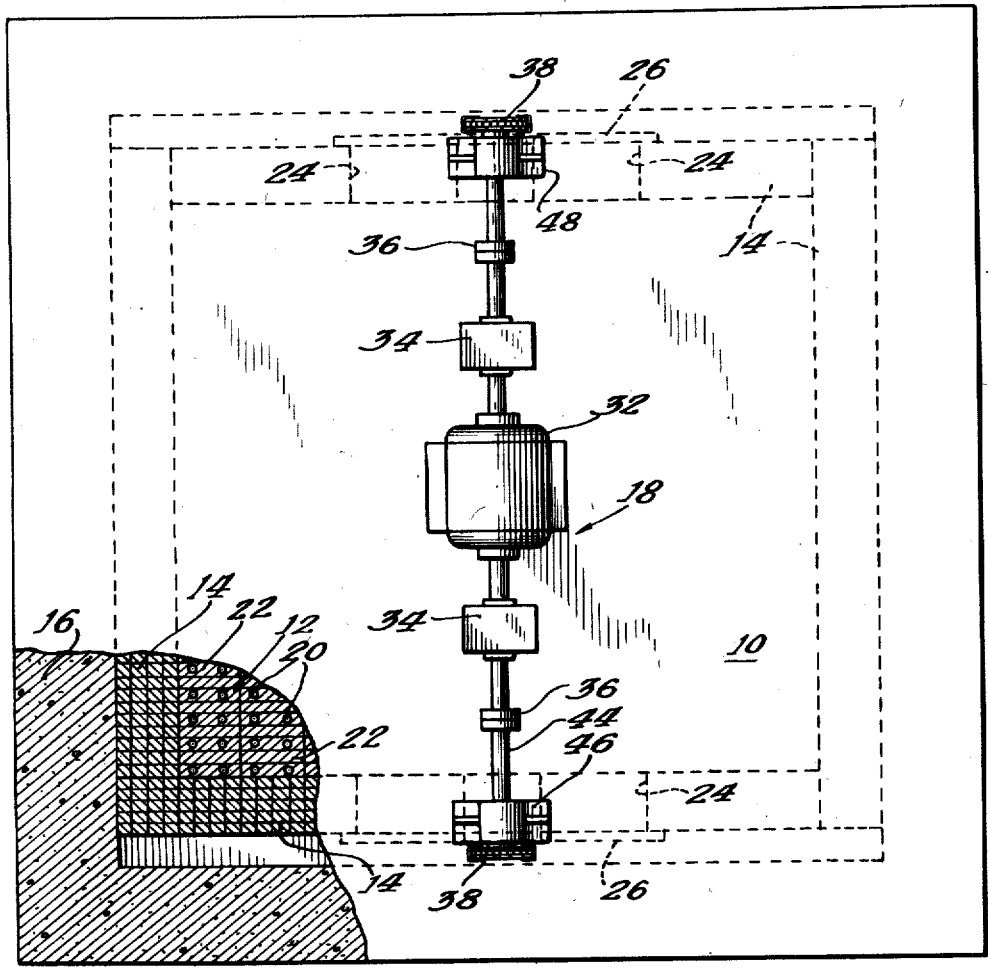
Figure 3 is a plan view of the neutronic reactor, partially cut away and in section.
Figure 4:
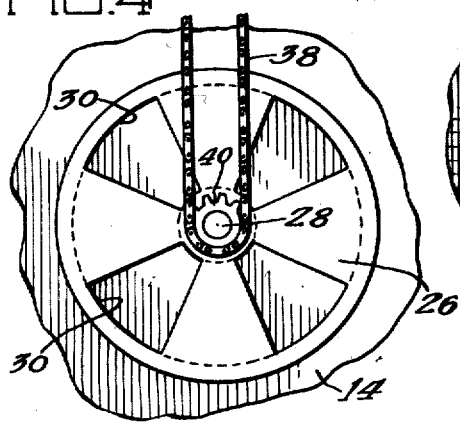
Figure 4 is an elevational view of the portion of the reactor shown in Figure 2 with the control means in the position of maximum neutron reproduction, the shield having been removed.
Figure 5:
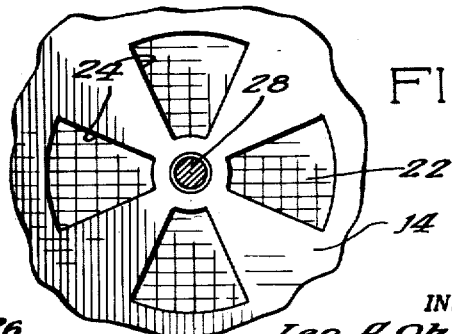
Figure 5 is a fragmentary sectional view taken along line 5—5 of Figure 2.

The shield 16 is positioned immediately adjacent to the reflector 14 on the top, bottom and sides of the reflector 14, but is spaced from the reflector 14 on the front and back of the reactor 10, as shown in Figure 3. The reflector 14 is provided with apertures 24 adjacent to the front and back faces of the active portion 12 of the reactor. These apertures 24 are in the shape of segments of a circle, there being four such segments adjacent to the front and back faces of the reactor 10, each of the segments being approximately 45°. Discs 26 constructed of a reflector material, such as beryllium, are mounted adjacent to the front and back faces of the reactor 10 on the axis of the segmental apertures 24 by pins 28 rotatably journaled within the discs 26. The discs 26 are also provided with segmental apertures 30 identical in number and shape with the segmental apertures 24 in the reflector 14.

The discs 26 are mechanically linked to a motor 32 positioned on top of the reactor 10. The mechanical linkage consists of a differential 34, coupler 36, chain 38, and a pair of sprockets 40 and 42, each sprocket 40 being affixed to one of the discs 26 and the sprockets 42 being affixed to shafts 44 which are coupled to the motor 32 and mounted upon support bushings 46 and 48. The motor 32 will supply the energy necessary to rotate the discs 26. Motor 32 is reversible, so that the discs 26 may be rotated in either direction, thus either bringing the segmental apertures 30 in the discs into better alignment with the segmental apertures 24 in the reflector 14 of the reactor 10 or into poorer alignment. Since the discs 26 are constructed of neutron reflecting material, they will reflect neutrons back into the active portion 12 of the reactor 10 when the segmental apertures 30 in the discs 26 are completely out of alignment with the apertures 24 in the reflector 14, thereby increasing the number of neutrons available for the reaction and allowing the reaction to diverge. However, when the segmental apertures 24 and 30 are aligned, neutrons may escape freely through these apertures and be absorbed in the shield 16. As a result, the escaping neutrons are not available to the reaction, and the reaction will become converging. Since the reactor is to be controlled by varying the magnitude of the neutron flux reflected back into the core of the reactor by the reflector 14, it is thus clear that the reactor must be of subcritical size in the absence of the reflector 14. It is thus necessary to construct the reactor to satisfy this condition.

In mathematic terms, the neutron flux distribution throughout a reactor of exactly critical size will follow the equation $$\nabla^2 n + \frac{k-1}{M^2} n = 0 \qquad (1)$$

where $\nabla^2 n$ in Cartesian coordinates is an abbreviation for the sum of the three second partial derivatives of $n$ with respect to the three axes, $x$, $y$, and $z$, $k$ is the reproduction factor for the reactor, and is a property of the lattice structure of the reactor, $M^2$ is the "migration area" which takes into account the slowing, scattering and capturing properties of the materials in the active portion of the reactor, and $n$ represents the neutron density within the reactor.

It is customary to substitute the equation $$B^2 = \frac{k-1}{M^2} \qquad (2)$$

into Equation 1 for convenience, where $B^2$ is called "buckling." Selecting coordinates in the customary manner with the origin at the center of the reactor, a neutron density distribution throughout a reactor which is a solution of Equation 1 may be expressed by the equations $$n = A \cos \frac{\pi x}{2L} \cos \frac{\pi y}{2L} \cos \frac{\pi z}{2L} \qquad (3)$$

$$n = A \cos \frac{Bx}{\sqrt{3}} \cos \frac{By}{\sqrt{3}} \cos \frac{Bz}{\sqrt{3}} \qquad (3a)$$

where $A$ is a constant of proportionality determined by the power level at which the reactor is operating, and the length of each side of the cube forming the reactor active portion is $$2L = \frac{\pi \sqrt{3}}{B} \qquad (4)$$

since $L$ is one-half of the length of each side of the active portion of the reactor.

In the design of practical reactors, it is desirable to modify Equation 1 to $$\nabla^2 n + \frac{k-r}{M^2} n = 0 \qquad (5)$$

where $r$ is the reproduction ratio of the reactor and is the ratio of the numbers of neutrons in successive generations in a finite reactor, where $k$ is the ratio of the number of neutrons in successive generations in a structure of infinite size.

The neutron distribution in the reflector of a reactor is given by the general equation $$\nabla^2 n = 0 \qquad (6)$$

and the size of a reactor having a cubical active portion surrounded by a hollow cubical reflector, the active portion being in the hollow portion of the reflector, will be given by the expression $$L = \frac{\pi}{\sqrt{3} B_r} \qquad (7)$$

where $Br$ is the term $B$ in the reflected reactor and $2L$ is the length of each side of the active portion of the reactor.

From these expressions, it may be found that the reproduction ratio $r$ produced by a cubical reactor without a reflector is smaller than the reproduction ratio $r_r$ produced by a reflected identical reactor, as given by the following equation:

$$r_r - r = \frac{5}{12} \frac{\pi^2 M^2}{D^2} \qquad (8)$$

If it is remembered that the total area of the reflector is $24 L^2$ ($L$ being one-half of each side of the reactor), the change in reactivity per unit area thereof is given by the equation $$\frac{r_r - r}{24 D^2} = 0.17 \frac{M^2}{L^4} \qquad (9)$$

and this equation may be used to determine the size of an aperture in a reflector which will adequately control such a reactor. To do so, $r$ must be arbitrarily chosen, which as a practical matter is not very difficult, since the rate of the development of the chain reaction is to be limited. If it is assumed that $r_r$ is to be greater than 1.00 but less than 1.005, and that $r$ is to be less than 1, a difference between $r_r$ and $r$ of .005 will be sufficient to control the reaction. In this case the size of the aperture, or sum of all apertures, in the reflector (designated S) can be computed from the following equation:

$$S = \frac{0.029 L^4}{M^2} \quad (10)$$

Values for the migration area M² may be found in the literature, and depend upon the materials used in the active portion and reflector of the reactor. As an example, the following values of M² have been found by measurement and calculations to be satisfactory for reactor design purposes:

| Material: | M² |
|---|---|
| Water | 40 cm.² |
| D₂O | 230 cm.² |
| Be | 300 cm.² |
| Graphite | 600 cm.²–700 cm.² |

The particular reactor described may be constructed with a graphite reflector of not less than 12 inches surrounding the active portion 12 of the reactor 10, and an active portion 12 approximately 17½ feet wide by 19½ feet deep constructed of graphite in which bodies of natural uranium are disposed in a geometric lattice. The active portion of the reactor may contain 17,640 lumps of uranium weighing approximately 6 to 8 lbs. each and totaling 104,000 lbs.; and approximately 14,438 lumps of uranium oxide of 5 and 6 lbs. each weighing a total of 84,000 lbs.

In such a reactor, the total area of the segmental apertures 24 should be approximately 53,700 cm.². The apertures 24 should be disposed centrally in the reflector on the sides of the reactor, since the neutron density at this location is greater than elsewhere on these faces, and hence the apertures 24 will permit more neutrons to leak through the reflector. Since the reflecting properties of beryllium are similar to those of graphite, the rotatable discs 26 may be approximately 12 inches in thickness, the thickness of the reflector.

It is of course understood, that any reactor which uses a reflector in order to become critical may be controlled in accordance with the teachings of the present invention, and that the invention is not limited to the particular neutronic reactors specifically described. Hence, it is intended that the scope of the present invention be limited only by the following claims.

What is claimed is:

1. A neutronic reactor comprising, in combination, an active portion cubical in shape having sides less than $$\frac{\pi\sqrt{3}}{B_r} \text{ and greater than } \frac{2\pi}{\sqrt{3}B_r}$$

where $B_r^2$ is the buckling within the active portion of the reflected reactor, a reflector rectangular in shape disposed about said active portion provided with at least one aperture, the total area thereof being approximately $$0.029 \frac{L^4}{M^2}$$

where 2 L is the length of each side of the active portion of the reactor and M² is the migration area of the active portion, and a disc constructed of neutron reflecting material rotatably mounted adjacent to the aperture, said disc covering the aperture in the reflector and having at least one aperture therein, the aperture in said disc being positioned to overlap the aperture in the reflector in at least one rotational position of the disc.

2. A neutronic reactor comprising the elements of claim 1 in combination with means to rotationally position the disc including a shaft extending outwardly from the reflector, the disc being rotatably disposed about the shaft and provided with an aperture aligning with the reflector aperture in one rotational position of the disc, a sprocket attached to the disc, a motor, and a chain interconnecting the motor and the sprocket.

3. A neutronic reactor comprising the elements of claim 1 wherein the disc is rotatably mounted adjacent to the aperture in the reflector by means including a shaft extending normal from the reflector, the disc being provided with a plurality of spaced apertures in the forms of sections of a circle having a common axis on the axis of the disc, the reflector aperture being also in the form of spaced circular sections centering on the axis of the shaft, and means to rotationally position the disc about the shaft.

4. A neutronic reactor comprising, in combination, an active portion cubical in shape having sides less than $$\frac{\pi\sqrt{3}}{B_r} \text{ and greater than } \frac{2\pi}{\sqrt{3}B_r}$$

where $B_r^2$ is the buckling within the active portion of the reflected reactor, a reflector constructed of solid material rectangular in shape disposed about the active portion, said reflector being provided with at least one aperture, the total area thereof being approximately $$0.029 \frac{L^4}{M^2}$$

where 2 L is the length of each side of the reactor active portion and M² is the migration area within the active portion of the reactor, a disc constructed of neutron-reflecting material rotatably mounted adjacent to the aperture, said disc covering the aperture in the reflector and having at least one aperture therein, means to rotationally position the disc including a shaft extending outwardly from the reflector, the disc being rotatably disposed about the shaft and provided with an aperture aligning with the reflector aperture in one rotational position of the disc, a sprocket attached to the disc, a motor, and a chain interconnecting the motor and the sprocket.

References Cited in the file of this patent

UNITED STATES PATENTS

| 2,708,656 | Fermi et al. | May 17, 1955 |

FOREIGN PATENTS

| 861,390 | France | Oct. 28, 1940 |
| 233,011 | Switzerland | June 30, 1944 |

OTHER REFERENCES

Nucleonics, January 1950, pages 10–14.

UNITED STATES PATENT OFFICE
CERTIFICATE OF CORRECTION

Patent No. 2,790,761                                                April 30, 1957

Leo A. Ohlinger

It is hereby certified that error appears in the printed specification of the above numbered patent requiring correction and that the said Letters Patent should read as corrected below.

Column 1, line 43, strike out "zone" and insert the same after "reaction" in line 44, same column; column 2, line 23, for "chosing" read --choosing--; line 49, after "in" insert --the--; column 4, line 57, equation (8), for "$D^2$" read --$L^2$--; line 65, equation (9), for "$D^2$" read --$L^2$--.

Signed and sealed this 14th day of January 1958.

(SEAL)
Attest:
KARL H. AXLINE

Attesting Officer

ROBERT C. WATSON
Commissioner of Patents